United States Patent
Martinitz

Patent Number: 6,009,892
Date of Patent: Jan. 4, 2000

[54] DEVICE FOR DISPOSAL OF LIQUID MEDIA

[75] Inventor: Hans-Peter Martinitz, Kuchen, Germany

[73] Assignee: F + F Filter- Und Foerdertechnik GmbH, Esslingen, Germany

[21] Appl. No.: 09/203,171

[22] Filed: Nov. 30, 1998

[30] Foreign Application Priority Data

Nov. 29, 1997 [DE] Germany ............ 197 53 085

[51] Int. Cl.⁷ ............ F04F 1/02
[52] U.S. Cl. ............ 137/1; 137/205; 137/208; 137/209; 417/138; 417/149
[58] Field of Search ............ 137/205, 208, 137/209, 1; 417/138, 149

[56] References Cited

U.S. PATENT DOCUMENTS

| | | | |
|---|---|---|---|
| 3,013,395 | 12/1961 | Gaylord. | |
| 3,730,884 | 5/1973 | Burns et al. | 137/209 |
| 5,575,307 | 11/1996 | Martinitz et al. | 197/205 |
| 5,590,678 | 1/1997 | Martinitz | 137/205 |
| 5,732,826 | 3/1998 | Martinitz et al. | 209/247 |

FOREIGN PATENT DOCUMENTS

| | | |
|---|---|---|
| 0 593 005 | 4/1994 | European Pat. Off. . |
| 44 30 959 | 3/1996 | Germany . |
| 44 36 003 | 4/1996 | Germany . |
| 195 01 921 | 7/1996 | Germany . |

*Primary Examiner*—Gerald A. Michalsky
*Attorney, Agent, or Firm*—Evenson McKeown Edwards & Lenahan, PLLC

[57] ABSTRACT

A device for disposal of liquid media such as coolant and lubricant fluids, containing production residues, such as chips from industrial processes in which these media are conveyed from at least one accumulation site through gutters and/or pipes to a recycling container. The media are conveyed from the recycling container through a pipe connected thereto close to the bottom to at least one collecting tank. The device is also intended to convey foamed media from the recycling container to the collecting tank at limited equipment cost. The recycling container is divided by a pressure-tight partition containing an operable valve into an upper supply chamber and a lower delivery chamber. A compressed air line with a switchable compressed air inlet valve and a vent line with a switchable vent valve are connected to the upper area of the delivery chamber. At least two sensors are located in the delivery chamber, spaced vertically apart from one another, and responding to the level of the media in the delivery chamber.

17 Claims, 4 Drawing Sheets

DEVICE FOR DISPOSAL OF LIQUID MEDIA

BACKGROUND AND SUMMARY OF THE INVENTION

The invention relates to a device for disposal of liquid media such as coolant and lubricant fluids, containing production residues, such as chips from industrial processes in which these media can be conveyed from at least one accumulation site through gutters and/or pipes to a recycling container and from the recycling container through a pipe connected thereto close to the bottom to at least one collecting tank.

Devices of this kind are known in a variety of embodiments, for example from European patent document EP 0 593 005 A1, German patent documents DE 44 30 959 A1, DE 44 36 003 A1, and DE 195 01 921 A1 as well as U.S. Pat. Nos. 5,590,678, 5,575,307, and 5,732,826, which have common ownership and overlapping inventorship with the instant application. The media are always delivered from the recycling container to the collecting tank by pumps.

One disadvantage of these known devices is that it is difficult to convey foamed media that contain considerable air, and pumps with especially large dimensions are required.

The goal of the invention is to be able also to convey foamed media from the recycling container to the collecting tank at a low equipment cost.

This goal is achieved in a device of the type descried above by dividing the recycling container with a pressure-tight partition containing an operable valve into an upper supply chamber and a lower delivery chamber, with a compressed air line with a switchable compressed air inlet valve being connected to the upper area of the delivery chamber and with a vent line with a switchable vent valve being connected to the same area, and with at least two sensors being located in the delivery chamber, spaced vertically apart from one another, and responding to the level of the media in the delivery chamber.

With the valve in the partition closed and the vent valve closed and with the compressed air inlet valve open, a pressure is generated in the delivery chamber by which the media can be delivered from the delivery chamber through the pipe into a collecting tank without the use of pumps being required.

Advantageously, at least one sensor that responds to the level of the media is located in the delivery chamber, said sensor serving as protection against overfilling. The pipe that leads to the collecting tank can contain a check valve that prevents backward flow of media from this pipe into the delivery chamber.

The vent line can terminate in the ambient atmosphere or in the upper area of the supply chamber. Venting to the upper area of the supply chamber has the advantage that entrained particles of media can be recycled and not pollute the environment. On the one hand, the valve in the partition can be designed as a switching valve that can be controlled in conjunction with the requirements of the operation of the device. On the other hand, the valve in the partition can be an automatic valve with a ball that floats in the delivery chamber as a function of the level of the media and thus closes the valve at a certain level. As a result, this valve is closed when the level of the media in the delivery chamber rises, and opens again when the level falls.

According to one preferred embodiment of the invention, the recycling container is open at the top and at least one supply line inclined relative to the recycling container for the media from at least one accumulation site located higher up terminates in the upper area of the supply chamber. This assumes that the accumulation site(s) of the media containing production residues is/are located higher than the delivery chamber in the recycling container and consequently the media can flow into the supply chamber under the influence of gravity.

The supply line can be designed as a pipe or gutter.

According to another preferred embodiment of the invention, the recycling container is sealed off at the top in a pressure-tight manner, with at least one suction line terminating in the upper area of the supply chamber. The suction line is connected at the other end to a gutter that can be filled with media from at least one accumulation site. The supply chamber and the delivery chamber in the recycling container can be subjected to reduced pressure by an evacuation device with an exhaust air outlet and containing switchable vacuum valves. The level of the accumulation site(s) relative to the level of the recycling container can be arbitrary because the media can flow through the suction line(s) into the supply chamber under the influence of the reduced pressure in the supply chamber.

Advantageously, a sensor can be provided in the end area of the gutter facing the suction line that responds to the level of the media in this end area. The sensor makes it possible for the evacuating device to be set operating in proper time.

According to another preferred embodiment of the invention, a plurality of recycling containers are provided with a pipe connected thereto and containing a check valve. A gutter and a suction line are connected upstream thereof. Sensors are provided in the delivery chamber, a compressed air line, and a vent line. An intermediate container is added in each case between the gutter and the suction line, with each of the containers containing at least one sensor that responds to the level of the media in the container. The plurality of recycling containers are connected in parallel with a single evacuation device. A vacuum switching valve is included in each vacuum main line that connects a recycling container with the evacuating device. As a result, disposal of liquid media containing production residues can be simplified, said residues coming from various accumulation sites at which liquid media containing production residues are not necessarily located simultaneously. This is the case for example when the accumulation sites are associated with various machine tools that can operate simultaneously or individually.

Other objects, advantages and novel features of the present invention will become apparent from the following detailed description of the invention when considered in conjunction with the accompanying drawings.

DETAILED DESCRIPTION OF THE DRAWINGS

Figure 1:
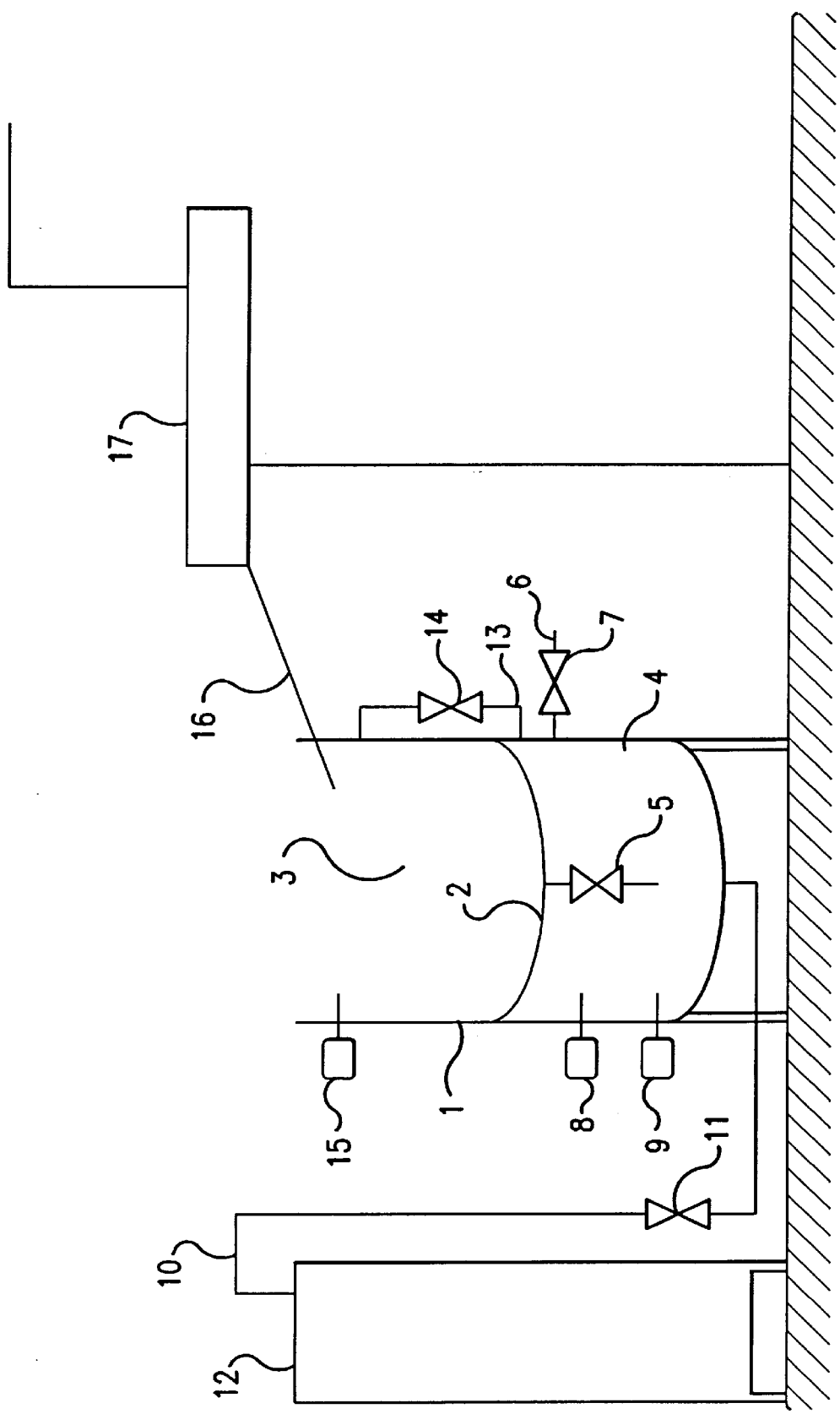
FIG. 1 shows one preferred embodiment of the present invention with a recycling container open at the top.
Figure 2:
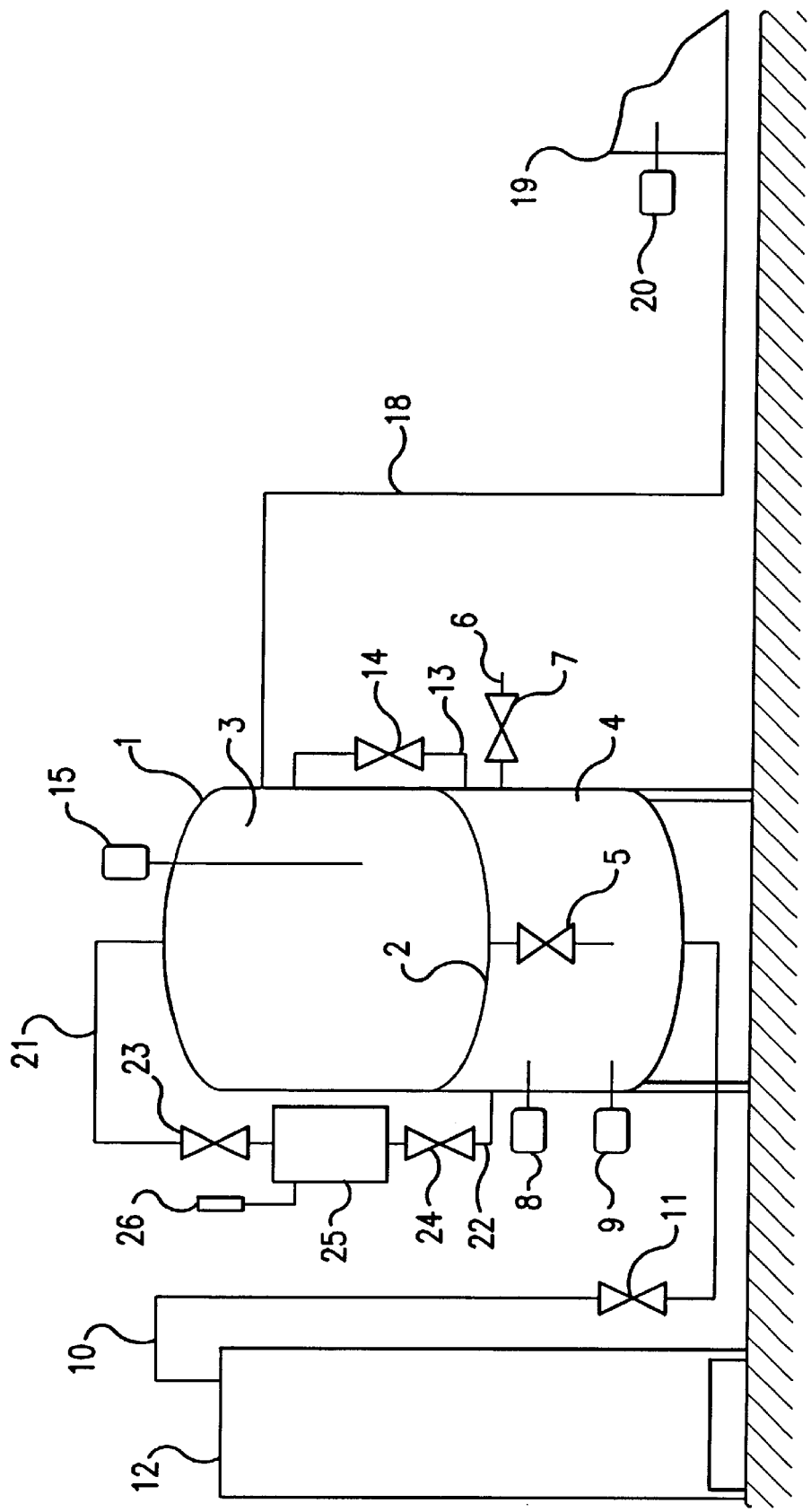
FIG. 2 shows another preferred embodiment of the present invention with a recycling container that is sealed off at the top in a pressure-tight manner.
Figure 3:
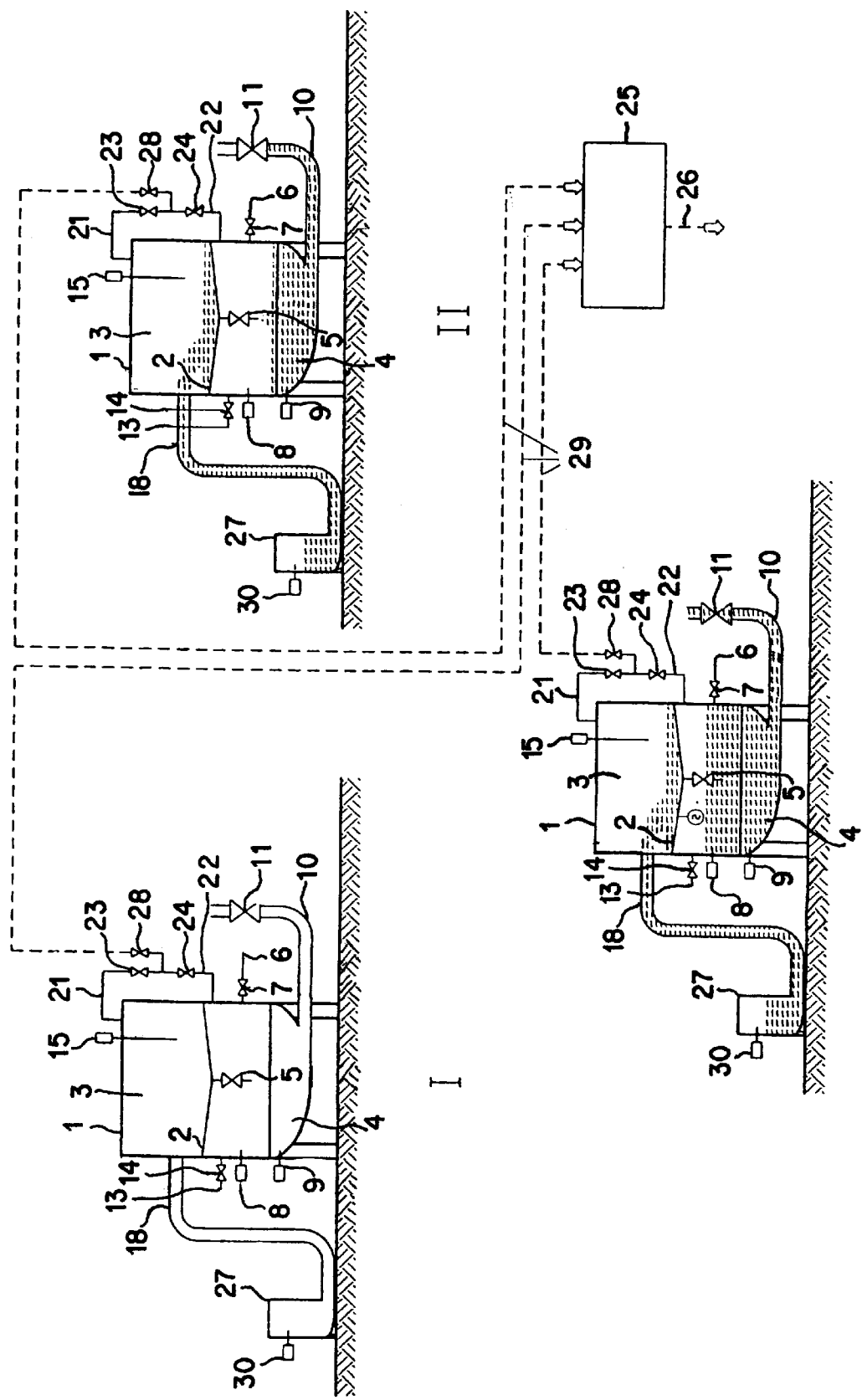
FIG. 3 shows another preferred embodiment of the present invention with three recycling containers sealed off at the top in a pressure-tight manner.

Referring to FIGS. 1–3, each recycling container 1 is divided by a partition 2, which is made sealed and pressure-tight, into an upper supply chamber 3 and a lower delivery chamber 4. Partition 2 contains a valve 5 which can be designed either as a switchable valve or as an automatic valve. A compressed air line 6 is connected in the upper area of delivery chamber 4 via a switchable compressed air inlet valve 7. Two sensors 8, 9 are provided in delivery chamber 4, said sensors being spaced apart from one another vertically and responding to the level of the media in delivery chamber 4. A pipe 10 is connected near the bottom to recycling container 1, said pipe containing a check valve 11 and leading to a collecting tank 12. A vent line 13 with a switchable vent valve 14 is connected to the upper area of delivery chamber 4. The vent line terminates either in the ambient atmosphere or in the upper area of supply chamber 3. A sensor 15 that responds to the level of the media is located in supply chamber 3.

To deliver the media from delivery chamber 4 and to convey the media further to collecting tank 12, the device is operated as follows. As soon as the level of the media that flow in through valve 5 has reached sensor 8 in delivery chamber 4, valve 5 closes automatically or is switched to close. Then, vent valve 14 is closed and compressed air inlet valve 7 is open. As a result, the pressure builds up in delivery chamber 4, conveying the media through pipe 10 into collecting tank 12 and opening check valve 11. Valve 5 remains switched or held closed by the increased pressure in delivery chamber 4. The media are delivered from delivery chamber 4 to collecting tank 12 until the level of the media in delivery chamber 4 has fallen to the level of sensor 9. At that time, compressed air inlet valve 7 is closed, vent valve 14 is opened, and valve 5 is switched or opened again automatically as a result of the fallen level of the media and the reduced pressure in delivery chamber 4. Check valve 11 closes automatically. Then media flow again through valve 5 from supply chamber 3 into delivery chamber 4.

In the first embodiment shown in FIG. 1, with recycling container 1 open at the top, an inclined line 16 terminates in the upper area of supply chamber 3, through which line media flow under the influence of gravity from a higher accumulation site 17 of the media into supply chamber 3. As soon as the level of the media flowing in has reached sensor 15, the further inward flow of media from accumulation site 17 through supply line 16 must be interrupted, and the associated machine tool is usually switched off.

In the second embodiment shown in FIG. 2, with recycling container 1 sealed off at the top in a pressure-tight manner, a suction line 18 terminates in the upper area of supply chamber 3. This line is connected at the other end to a gutter 19 in which media collect from at least one accumulation site, not shown in the drawing. A sensor 20 is located in the end area of gutter 19 that responds to the level of the media therein. An evacuation device 25 with an exhaust air outlet 26 is connected to recycling container 1 in the upper areas of supply chamber 3 and delivery chamber 4 via vacuum lines 21, 22 with switchable vacuum valves 23, 24 contained therein. As a result, recycling container 1 can be exposed to reduced pressure so that media can be sucked through suction line 18 out of gutter 19.

During the operation of the second embodiment of the device shown in FIG. 2, the following special features must be taken into account. As soon as the level of the media in gutter 19 has reached sensor 20, evacuation device 25 is switched on. Valve 5 in partition 2, vacuum valve 24, and vent valve 14 are opened. Compressed air inlet valve 7 is closed. As soon as the level of the media in delivery chamber 4 has reached sensor 8, the conveyance of the media from delivery chamber 4 into collecting tank 12 is switched on, whereupon vacuum valve 24 must also be closed in vacuum line 22 that is connected to delivery chamber 4. During this time, media can be delivered to supply chamber 3 from gutter 19 by suction line 18. This must be interrupted when the level of the media in supply chamber 3 reaches sensor 15. After the level of the media in delivery chamber 4 drops and thus the delivery into collecting tank 12 ends, vacuum valve 24 must also be opened again and vacuum valve 23 must be closed.

In the third embodiment shown in FIG. 3, with three recycling tanks 1 sealed off in a pressure-tight manner at the top, the three recycling containers 1 with their pipes 10 that are connected and contain a check valve 11, and with the gutter located upstream and with suction line 18 connected upstream, are both equipped with sensors 8, 9 in delivery chamber 4, compressed air line 6, and vent line 13 as in the second embodiment. In addition, each suction line 18 has an intermediate container 27 located upstream into which liquid media can flow from at least one accumulation site, not shown in the drawing, through a gutter, likewise not shown in the drawing. At least one sensor 30 that responds to the level of the media therein is located in each intermediate container 27. The three units I to III that each include a recycling container 1 with associated parts are each shown in a different operating state. The three recycling containers 1 are connected in parallel with a single evacuation device 25, i.e. each is connected through a vacuum main line 29 with vacuum switch valve 28 provided therein.

The operation of the third embodiment of the device is controlled such that when liquid media containing production residues accumulate at least one accumulation site, for example when one of the associated machine tools is running, evacuation device 25 is constantly operating. Evacuation device 25 can then be switched on when a sensor 30 that detects the level in one of the intermediate containers 27 responds as a result of liquid media collecting in this intermediate container 27. This response of sensor 30 can also trigger the opening of previously closed vacuum switching valve 28 located in vacuum main line 29 connecting the associated recycling container 1 with evacuation device 25. The vacuum switching valves 28 in vacuum main lines 29 between the other recycling containers 1 and evacuation device 25 remain closed and are opened only when sensors 30 in the other intermediate containers 27 respond to detect the level. Correspondingly, vacuum switching valves 28 are closed again when the level in intermediate containers 27 has dropped to the point where sensors 30 no longer respond. Otherwise, the operation of the third embodiment is the same as that of the second embodiment.

The operating state of unit I is such that intermediate container 27 and recycling container 1 are empty and associated vacuum switching valve 28 is closed. The operating state of unit II is such that intermediate container 27 contains liquid media that are drawn into recycling container 1. Associated vacuum switching valve 28 is open.

The operating state of unit III is such that intermediate container 27 contains liquid media that are sucked into recycling container 1 which is to be emptied completely in the same way as intermediate container 27. The associated vacuum switching valve 28 and vacuum valve 23 are opened. Vacuum valve 24 is closed. In addition, compressed air inlet valve 7 is opened and vent valve 14 is closed.

Figure 5:
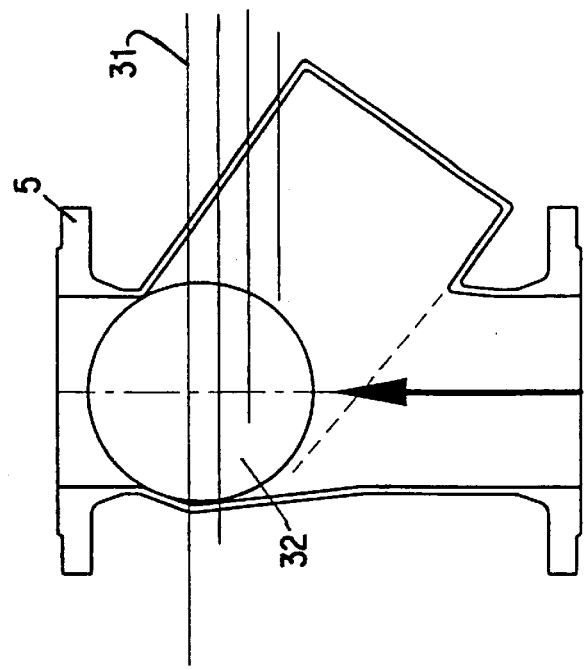
FIG. 5 shows the valve according to FIG. 4 in the closed state.
Figure 4:
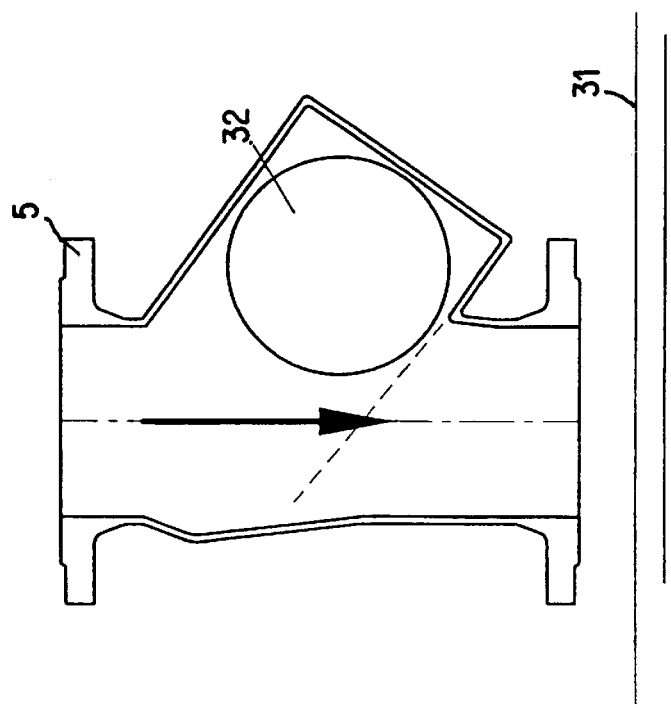
FIG. 4 shows an automatic valve in cross section in the open state.

An automatic valve 5 is opened when the level 31 of the media in delivery chamber 4 has fallen and allows a through flow from top to bottom. As shown in FIG. 4, the ball 32 that forms the operating element of valve 5 and can float in the media is off to the side and not in an operating position. As shown in FIG. 5, when level 31 of the media in the delivery chamber 4 rises, valve 5 is closed by floating ball 32.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A device for disposal of at least partially liquid media, comprising:

a recycling container;

a partition defining an upper supply chamber and a lower delivery chamber in said recycling container, said supply chamber for receiving said media;

an operable valve operable to selectively communicate said supply chamber with said delivery chamber;

a conduit communicating a lower area of said delivery chamber with at least one collecting tank;

a compressed air supply line selectively communicable with an upper area of said delivery chamber via a switchable compressed air inlet valve;

a vent line selectively communicable with an upper area of said delivery chamber via a switchable vent valve; and at least two sensors provided in said delivery chamber, said sensors being spaced vertically apart from one another and sensing a level of the media in said delivery chamber.

2. A device according to claim 1, wherein said media comprises at least one of a cooling fluid, a lubricating fluid, and production residue from industrial processes.

3. A device according to claim 1, wherein said recycling container receives said media from at least one accumulation site through at least one of gutters and pipes.

4. A device according to claim 1, further comprising at least one further sensor located in said supply chamber, said further sensor sensing a level of the media in said supply chamber.

5. A device according to claim 1, further comprising a check valve disposed in said conduit.

6. A device according to claims 1, wherein said vent line selectively communicates said upper area of said delivery chamber with the ambient atmosphere.

7. A device according to claim 1, wherein said vent line selectively communicates said upper area of said delivery chamber with an upper area of said supply chamber.

8. A device according to claim 1, wherein said operable valve is a switching valve.

9. A device according to claim 1, wherein said operable valve is an automatic valve including a ball that floats in said media to close said operable valve as a function of the level of the media in said delivery chamber.

10. A device according to claim 1, wherein a top of said recycling container is open, at least one accumulation site is located above said supply chamber, and at least one inclined supply line communicates said at least one accumulation site with an upper area of said supply chamber.

11. A device according to claim 10, wherein said at least one inclined supply line is designed as a pipe.

12. A device according to claim 10, wherein said at least one supply line is designed as a gutter.

13. A device according to claim 1, wherein a top of said recycling container is sealed off in a pressure-tight manner, at least one suction line communicating an upper area of said supply chamber with a gutter which contains said media, and an evacuation device being selectively communicable with an upper area of said supply chamber and with an upper area of said delivery chamber via vacuum lines with switchable vacuum valves.

14. A device according to claim 13, wherein a sensor is located in an end area of said gutter, said sensor responding to a level of said media in this end area.

15. A device according to claim 13, further comprising a plurality of said recycling containers, each of said recycling containers having a respective said conduit, said gutter, said suction line, said at least two sensors, said compressed air supply line, said vent line, a respective check valve being disposed in each said conduit, an intermediate container being interposed between each said gutter and corresponding said suction line, at least one sensor being provided in said intermediate container that senses a level of said media therein, said plurality of recycling containers being connected in parallel to a single said evacuating device via respective ones of said vacuum lines, and an additional vacuum switching valve being disposed in each of said vacuum lines that connect said plurality of recycling containers with said evacuating device.

16. A device according to claim 1, further comprising means for controlling flow of said media through said device such that:

(a) when said level of said media in said delivery chamber reaches an upper one of said at least two sensors, said operable valve is closed, said switchable vent valve is closed, and said compressed air inlet valve is opened;

(b) when said level of said media in said delivery chamber reaches a lower one of said at least two sensors, said compressed air inlet valve is closed, said switchable vent valve is opened, and said operable valve is opened.

17. A method for controlling flow of at least partially liquid media through a device for disposal of said media, said device comprising:

a recycling container;

a partition defining an upper supply chamber and a lower delivery chamber in said recycling container, said supply chamber for receiving said media;

an operable valve operable to selectively communicate said supply chamber with said delivery chamber;

a conduit communicating a lower area of said delivery chamber with at least one collecting tank;

a compressed air supply line selectively communicable with an upper area of said delivery chamber via a switchable compressed air inlet valve;

a vent line selectively communicable with an upper area of said delivery chamber via a switchable vent valve; and at least two sensors provided in said delivery chamber, said sensors being spaced vertically apart from one another and sensing a level of the media in said delivery chamber;

said method comprising:
(a) when said level of said media in said delivery chamber reaches an upper one of said at least two sensors, closing said operable valve, closing said switchable vent valve, and opening said compressed air inlet valve;

(b) when said level of said media in said delivery chamber reaches a lower one of said at least two sensors, closing said compressed air inlet valve, opening said switchable vent valve, and opening said operable valve.

* * * * *